(12) United States Patent
Tasaki

(10) Patent No.: US 6,805,738 B2
(45) Date of Patent: Oct. 19, 2004

(54) ROAD REPAIRING MATERIAL

(75) Inventor: Isao Tasaki, Ibaraki-ken (JP)

(73) Assignee: Osamu Tasaki, Ibaraki-ken (JP)

(*) Notice: Subject to any disclaimer, the term of this patent is extended or adjusted under 35 U.S.C. 154(b) by 0 days.

(21) Appl. No.: 10/430,566

(22) Filed: May 6, 2003

(65) Prior Publication Data
US 2003/0211313 A1 Nov. 13, 2003

(30) Foreign Application Priority Data
May 8, 2002 (JP) .......................... 2002-132968

(51) Int. Cl.⁷ ............................................ C09D 195/00
(52) U.S. Cl. .................................. 106/280; 106/284.04
(58) Field of Search ............................ 106/280, 284.04

(56) References Cited

U.S. PATENT DOCUMENTS

| | | | | |
|---|---|---|---|---|
| 1,739,652 A | * | 12/1929 | Sadtler ........................ | 106/280 |
| 2,073,907 A | * | 3/1937 | Scullin ........................ | 106/280 |
| 2,603,573 A | * | 7/1952 | Blott et al. .................. | 106/269 |
| 2,939,800 A | * | 6/1960 | Fox et al. .................... | 106/280 |
| 4,068,023 A | * | 1/1978 | Nielsen et al. ............... | 427/138 |
| 6,203,606 B1 | * | 3/2001 | Bond et al. .................. | 106/278 |

* cited by examiner

Primary Examiner—David Brunsman
(74) Attorney, Agent, or Firm—Flynn, Thiel, Boutell & Tanis, P.C.

(57) ABSTRACT

A road repairing material of the invention has a very excellent adhesive property and adherent property to an existing paved road surface and aggregate, and even if several years has passed since the repair, displacement, peeling, cracking and the like do not occur in the repaired spot. Besides, even if the material is exposed to air after opening of a bag, it does not change its quality and is not hardened for a long period of 3 to 5 years, and accordingly, the quantity of the material used can be selected taking a repair spot into consideration, and the remainder material can be sufficiently used for next repair work and is not required to be discarded as waste material, and therefore, the very economical road repairing material can be provided. In this road repairing material, a road paving member produced by heating and mixing blown asphalt, lubricating oil or lubricating oil waste fluid, semi-blown asphalt, and fine particles of hydrated lime and steel slag, and paving aggregate are heated and mixed to form a coating layer around the paving aggregate, and a covering layer made of a noncohesive material is formed on the coating layer.

13 Claims, No Drawings

ROAD REPAIRING MATERIAL

BACKGROUND OF THE INVENTION

1. Field of the Invention

The present invention relates to a road repairing material mainly used for small-scale repair of a recess (small hole), a crack or the like of a road caused by traffic vehicles and excellent in water permeability, and particularly to a road repairing material capable of being stored for a long period of time as a repairing material for an asphalt paved road or a concrete paved road, and provides a stable material in which a portion repaired by using the road repairing material has excellent durability at either of the time of cold of winter and the time of high temperature of summer, and a phenomenon such as displacement or peeling does not occur for a long period of time.

2. Description of the Related Art

Conventionally, as a road repairing material, it is common to use the same material as one used as a road paving member, and asphalt as the main material is manufactured by large-scale manufacture means such as plant manufacture, and is used at a job site for repair. However, a spot of a road to be repaired is often small, the quantity of the road repairing material manufactured by the conventional manufacture means is such that it can not be completely consumed in the small repair spot, and the remaining road repairing material can not be stored and is hardened, so that it can not be reused and is processed as waste material.

Under the above circumstances, in recent years, a development has been made such that an asphalt composite usable at room temperature is packed and stored in a bag, and at the time of repair, the bag is opened and the asphalt composite can be used. However, although the material is stored in a sealed state by the bag when not in use, since a polymeric material is used as a binder, its expiration date is approximately 3 to 6 months.

Further, the remaining material after the opening of the bag used for the repaired spot quickly changes the quality with the lapse of time even if the bag is closed and a management is made, so that it can not be used for next repair work, and it is processed as waste material similarly to the above.

SUMMARY OF THE INVENTION

The present invention relates to a road repairing material made for solving the above problem of the related art, and provides a very economical road repairing material in which a remainder material exposed to air after the opening of a bag does not change its quality and is not hardened at room temperature for a long period of 3 to 5 years, and accordingly, the quantity of the material used can be selected taking a repaired spot into consideration, and the remainder material can be sufficiently used for next repair work, and the material is not required to be discarded as waste material.

Besides, the road repairing material of the invention is excellent in water permeability, its adhesive property and adherent property to an existing paved road and aggregate is very excellent, and even if several years has passed since the repair, displacement, peeling, cracking and the like do not occur in the repaired spot.

Further, there does not occur such a case where after repair at the time of cold, the elasticity is lowered and shock resistance becomes insufficient, so that an impact sound of a moving automobile increases in winter, cracking occurs, rainwater permeates through the spot, and peeling or distortion occurs.

Besides, even at the time of high temperature of summer in which a road temperature becomes as high as 60° C., there does not occur such a case that the road repairing material of the invention melts onto the road surface, adheres to a tire of an automobile, and fouls the vehicle or the road surface, and therefore, the execution of work is easy even at the time of high temperature of summer. Further, at the time of a rain, a road surface state in which a slip is apt to occur is not produced.

Besides, the execution of work at a repair site can be performed in a short time, and the harden ability is excellent, so that it takes little time to release the traffic.

As described above, the invention provides the road repairing material which always keeps suitable viscosity and shock resistance even at the time of cold of winter, the time of high temperature of summer when the temperature of a paved surface or worked surface exceeds 60° C., or the time of a rain, has a high adhesive property so that cracking, displacement or peeling do not occur for a long period of time, and can hold high durability and high stability because of a heating-type mixture.

In order to achieve the above object, a road repairing material of the invention is characterized in that a road paving member produced by heating and mixing blown asphalt, lubricating oil or lubricating oil waste fluid, semi-blown asphalt, and fine particles of hydrated lime and steel slag, and paving aggregate are heated and mixed to form a coating layer around the paving aggregate, and a covering layer made of a noncohesive material is formed on the coating layer.

Besides, a road repairing material is characterized in that a road paving member produced by heating and mixing blown asphalt or compound asphalt, lubricating oil or lubricating oil waste fluid, hydrated lime and rubber member, and paving aggregate are heated and mixed to form a coating layer around the paving aggregate, and a covering layer made of a noncohesive material is formed on the coating layer.

The road repairing material is characterized in that the road paving member is mixed with the paving aggregate at a ratio of approximately 5 to 15 wt. %.

Besides, the road repairing material is characterized in that the road paving member is obtained by adding the lubricating oil or the lubricating oil waste fluid of 5 to 40 wt. %, the semi-blown asphalt of 5 to 40 wt. %, the hydrated lime of 15 to 35 wt. %, and the steel slag of 5 to 15 wt. % to the blown asphalt, and mixing them for a suitable time while heating.

Further, the road repairing material is characterized in that the road paving member is obtained by adding the lubricating oil or the lubricating oil waste fluid of 5 to 40 wt. %, the rubber member of 1 to 30 wt. %, and the hydrated lime of 5 to 45 wt. % to the blown asphalt or the compound asphalt, and mixing them for a suitable time while heating.

Besides, the road repairing material is characterized in that a particle size of the road repairing material is 2.5 mm to 20 mm.

Further, the road repairing material is characterized in that the road repairing materials are classified into parts of particle sizes of approximately 2.5 mm to 5 mm, approximately 5 mm to 13 mm, and approximately 13 mm to 20 mm, and they are separately managed.

DETAILED DESCRIPTION OF THE INVENTION

Embodiment 1

First, paving aggregate is dried by a dryer, and primer (mixture of oil asphalt and organic solvent etc.) is impregnated into the paving aggregate and is dried.

Crushed stones are used as the paving aggregate, and the particle size is such that a completed material as a road repairing material has a particle size of approximately 2.5 mm to 20 mm. The particle size of the paving aggregate is suitably adopted in accordance with the kind of pavement and the object of repair. For example, there is a case where those of the above particle size are mixed and used, or a case where those of the particle size adjusted within a certain range are used.

Besides, a road paving member used in the invention is manufactured in a manner as described below.

Lubricating oil is contained in a vertical heating and mixing tank and is heated and stirred at 90 to 110° C. to remove water and impurities in the lubricating oil, and subsequently, it is heated and stirred at a temperature of 110 to 130° C. for 3 to 4 hours to evaporate gas of light oil in the lubricating oil, and then, heating and stirring is stopped to naturally cool it to room temperature, so that additive lubricating oil is completed, and the additive lubricating oil is contained in a tank and is stored at room temperature.

When the road paving member is manufactured, first, blown asphalt of a penetration of 10 to 20 or 20 to 30 is contained in a vertical heating and mixing tank and is heated, and when the temperature of the blown asphalt is raised to 160° C., while the processed additive lubricating oil of 5 to 40 wt. % is gradually added to the blown asphalt, heating and stirring are carried out up to 180° C., and the heating and stirring are carried out at 180° C. for approximately 3 hours, so that the blown asphalt and the lubricating oil are melted and mixed.

Next, while the molten mixture material of the blown asphalt and the lubricating oil is heated at 180 to 200° C., fine particles of hydrated lime and steel slag are added and are stirred for approximately 3 to 4 hours, and subsequently, they are kept at a temperature of 210° C. for approximately 1 hour, and stirring is continued until voids generated on the surface of the road paving member in a molten state disappear, and the temperature is kept at a suitable temperature according to application or is cooled.

The blown asphalt has a penetration of 10 to 20 or 20 to 30, and softening point of 90 to 110° C. and is stable against high temperature.

Besides, the lubricating oil or lubricating oil waste fluid has such a property that a change of viscosity with respect to a temperature change is small at both a high temperature and a low temperature, and is liquid even at −30° C. Besides, what is once used for an internal combustion engine is little influenced by various additives and is stable in composition, and therefore, the fusion reaction with the blown asphalt or the compound asphalt of the base material can be easily performed.

Further, the fine particles of hydrated lime and steel slag are diffused in the asphalt after the fusion reaction produced by adding the lubricating oil or lubricating oil waste fluid to the blown asphalt or compound asphalt, and prevent the oxidation of the road paving member. Further, they enhance the adhesive property or adherent property to a pavement road surface and a bridge floor slab or aggregate, and since they are inorganic, they are hardly influenced by a temperature change, and especially the stability at the time of high temperature can be improved.

The above respective raw materials are set with respect to the blown asphalt within such ranges that the addition amount of lubricating oil or lubricating oil waste fluid is 5 to 40 wt. %, the addition amount of semi-blown asphalt is 5 to 40 wt. %, the addition amount of hydrated lime is 15 to 35 wt. %, and the addition amount of steel slag is 5 to 15 wt. %. As the hydrated lime and steel slag, for example, fine particles of approximately #200 are used.

An optimum blending example as the road paving member will be described below.

Blending Example 1:
(1) blown asphalt (penetration of 10 to 20 or 20 to 30); 60 wt. %,
(2) lubricating oil or lubricating oil waste fluid; 6 wt. %,
(3) semi-blown asphalt; 6 wt. %
(4) hydrated lime; 20 wt. %, and
(5) steel slag; 6 wt. %.

Blending Example 2:
(1) blown asphalt (penetration of 10 to 20 or 20 to 30); 80 wt. %,
(2) lubricating oil or lubricating oil waste fluid; 7 wt. %,
(3) semi-blown asphalt; 7 wt. %
(4) hydrated lime; 4 wt. %, and
(5) steel slag; 2 wt. %.

The above blending examples 1 and 2 are merely terminuses obtained by experiments carried out until now, and there is a possibility that a road paving member having superior properties is realized by slightly changing the blending within a range of ±5% on the basis of the blending examples 1 and 2.

The paving aggregate into which the primer (mixture of oil asphalt and organic solvent etc.) has been impregnated and which has been dried is heated to 30 to 100° C., and it, together with the road paving member having the above composition, which has been melted by a melting kettle and has been manufactured within the range of a temperature of 150 to 180° C., is heated and mixed by a mixing machine. The road paving member is mixed with the paving aggregate at a weight ratio of approximately 10 to 25%, and a thick coating layer of the road paving member is formed around the paving aggregate.

A covering layer made of a noncohesive material is further formed on the coating layer around the mixed repairing mixture. As means for forming the covering layer, various means such as sprinkling can be adopted. After the covering layer is formed, the product is cooled, weighing of a predetermined amount is performed, and bagging is performed.

The covering layer prevents the repairing mixture from coupling to each other or from adhering to a bag, and enables storage thereof at room temperature for a long period of time.

As the noncohesive material, one having a separation function is optimum, and a material made of an alkaline mineral fine powder is suitable.

Besides, the particle size can be previously adjusted in a factory or the like and packing into a bag can be performed according to that, or the particle size can also be selected according to a repair situation at a repair site.

Further, in the case where the particle size is made 2.5 mm to 5 mm, the ratio of the road paving member is made 5 to 15 wt. %, and in the case where the particle size is made 5 mm to 20 mm, the ratio of the road paving member is made 5 to 10 wt. %.

In the case where the road paving material is used, first, mud, dust, water and the like of a repair surface of a spot where plastic deformation or fissuring such as a crevice or a crack occurs are cleaned on a paved road. Although the above step is not necessarily required, it is preferable that cleaning is performed to raise an effect.

The road paving material is selected at the working site to have the above particle size and is taken out from a bag or the material is taken out as it is, a suitable amount thereof is heated and melted in a melting kettle, and a necessary amount of road repairing material is applied to a maintenance surface to repair.

The road repairing material is heated so that the thick coating layer and the covering layer are melted, and the paving aggregate and the road paving member are well mixed.

The road repairing material is laid by a pushing rod, a rake, a scoop or the like so that it becomes uniform, and is pressed by a tamper or a plate to perform the execution of work.

The road repairing material is cooled in several minutes after the execution of work, and its harden ability is good, so that it does not take a long time until the traffic is released.

Embodiment 2

Another example of a road paving member used for a road repairing material of the invention will be described below.

In order to manufacture the road paving member, first, molten blown asphalt or compound asphalt is put in a vertical mixing tank with a heating apparatus, and stirring is performed within a temperature range of 160 to 200° C.

Next, similarly to the embodiment 1, while lubricating oil or lubricating oil waste fluid of 5 to 40 wt. % in which water, light oil and impurities are removed, and powder rubber of 1 to 30 wt. % are similarly gradually added to blown asphalt or compound asphalt, the temperature is kept at 160 to 300° C., and stirring is performed for 3 to 4 hours, so that the blown asphalt or compound asphalt and the lubricating oil or lubricating oil waste fluid are melted and reacted, and at the same time, the powder rubber is swelled.

Next, while hydrated lime of 5 to 45 wt. % is gradually added to the blown asphalt or compound asphalt, mixing is performed for approximately 3 to 5 hours, and the temperature of the mixture is kept according to application or it is cooled to be solidified. A solidified one is crushed into parts each having a size near a cigarette case so as to facilitate handling by manual operation and so as to facilitate melting, and is packed in a sandbag or the like. The powder rubber is made granular rubber or the like.

The operation and effect of the road paving member constituting the invention are as follows.

The blown asphalt as the base material has a penetration of 10 to 20 or 20 to 30 and a softening point is 90 to 100° C., the compound asphalt has a penetration of 20 to 40 and a softening point of 100 to 110° C., and both the base materials are stable against high temperature.

The lubricating oil or lubricating oil waste fluid has such a property that a change of viscosity with respect to a temperature change is small at both a high temperature and a low temperature, and is liquid even at −30° C. Besides, what is once used for an internal combustion engine is little influenced by various additives and is stable in composition, and therefore, the fusion reaction with the blown asphalt or the compound asphalt of the base material can be easily performed.

The lubricating oil or lubricating oil waste fluid having the above property is mixed with the blown asphalt or compound asphalt, and is fused with resin oil of the component of the asphalt, so that the brittleness of the road paving member at the time of low temperature is improved, and as a whole, the durability and stability as the road paving member can be improved.

Besides, the fine particles of hydrated lime are diffused in the asphalt after the fusion reaction produced by adding the lubricating oil or lubricating oil waste fluid to the blown asphalt or compound asphalt, prevent the oxidation of the road paving member, and can increase the adhesive property or adherent property to the pavement road surface and bridge floor slab or the aggregate. Since the hydrated lime is inorganic, it is hardly influenced by temperature change, and especially the stability at the time of high temperature can be improved.

Further, the rubber member swells the road paving member and promotes gelation of the road paving member to raise viscosity, so that the water resistance, adhesive property, cohesiveness, elasticity, and shock resistance are raised, shock due to a traffic load or the like is relieved, stress and distortion generated in a pavement layer is dispersed, the occurrence of cracking is suppressed, toughness by which displacement or peeling of the pavement body is hard to produce is realized, the sensitivity to temperature of the road paving member is improved to become small, adhesive strength becomes high as compared with a conventional material, and the durable years of the pavement surface can be greatly prolonged.

Besides, the rubber member made into the powder rubber has an effect to enable a uniform fusion state in a short time.

By the above constitution, the excellent road paving member greatly exceeding the prior art can be realized in which the heat resistance with softening point considerably exceeding 60° C. is realized, hardening does not occur at the time of cold and suitable viscosity is kept, and the penetration, ductility, brittle point and the like are greatly improved.

An optimum blending example as the road paving member is as-follows:

(1) blown asphalt (penetration of 10 to 20 or 20 to 30); 50 wt. %,
(2) lubricating oil or lubricating oil waste fluid; 25 wt. %,
(3) hydrated lime; 20 wt. %, and
(4) powder rubber; 5 wt. %.

According to this blending example, the excellent road paving member can be realized in which the softening point is 90° C., the penetration is 49 (25° C.1/10 mm), the ductility is 3 (15° C./cm), and the brittle point is −19° C.

An optimum blending example in the case where the compound asphalt is made the base material is as follow:

(1) compound asphalt (penetration of 20 to 40); 60 wt. %,
(2) lubricating oil or lubricating oil waste fluid; 30 wt. %,
(3) hydrated lime; 5 wt. %, and
(4) powder rubber; 5 wt. %.

The above blending example also makes it possible to realize the road paving member having properties similar to the former blending example.

The above blending examples 1 and 2 are merely terminuses obtained by experiments carried out until now, and there is a possibility that a road paving member having superior properties is realized by slightly changing the blending within a range of ±5% on the basis of the above blending examples.

The paving aggregate into which the primer (mixture of oil asphalt and organic solvent etc.) has been impregnated and which has been dried is heated to 30 to 100° C., and it, together with the road paving member which has been melted by a melting kettle and has been kept and manufactured within the range of a temperature of 150 to 180° C., is mixed by a mixing machine, in which the road paving member is mixed with the paving aggregate at a weight ratio of approximately 5 to 15%.

Next, a covering layer made of a noncohesive material is further formed on a coating layer around the mixed repairing mixture. As means for forming the covering layer, various means such as sprinkling can be adopted. After the covering layer is formed, the product is cooled, weighing of a predetermined amount is performed, and bagging is performed.

The covering layer prevents the repairing mixture from coupling to each other or from adhering to a bag, and enables storage thereof at room temperature for a long period of time.

As the noncohesive material, one having a separation function is optimum, and a material made of an alkaline mineral fine powder is suitable.

Means for carrying out repairs to a maintenance surface at a working site by using the road paving member is similar to the embodiment 1.

In the above embodiments 1 and 2, the description has been made on the basis of the examples in which the material is mainly used as the road repairing material, it is needless to say that the road repairing material of the invention is used for floors, roofs and the like of various structures. Besides, similarly, when the material of the invention is used at a spot requiring water resistance, such as a toilet, a bath and a kitchen, of various structures, the same effects as those described below can be obtained.

The road repairing materials of the invention can be stored in bags individually or mixedly according to the particle size, and the covering layer of the noncohesive material is formed on the outer peripheral surface of each of the materials, so that they do not adhere to each other or to the bag, and they can be stored for a long period of time as they are. Also after opening of the bag, the same applies.

Besides, the material of the invention is not melted at the time of high temperature of summer, it is possible to form chips which are easy to handle, and to pack them in bags, and to sell, transported, and use them.

Further, at a repair site, the road repairing material is heated by using heating means such as a propane gas burner, and it is possible to quickly repair a spot requiring urgent repair from the viewpoint of traffic safety, such as a small hole, peeling, edge defect and the like of asphalt pavement or concrete pavement, as well as a small hole (pot hole) of a pavement surface.

Besides, even under the blazing sun of summer in which the work surface exceeds 60° C., the repairing work is possible, and even under the situation in which the work surface exceeds 60° C., quick cooling and hardening of the material advances, and in the case where the material is used as the road repairing material, it is possible to quickly release the traffic after the end of the pavement operation or the repairing operation.

Further, since the material has suitable viscosity even at the time of cold, it is not hardened, and the very stable material is realized in which even if high load, shock or vibration is applied, a phenomenon such as displacement, cracking, rising or peeling do not occur.

Further, as a result of an exposure test etc. of repair work, a phenomenon such as cracking, displacement or peeling hardly occurs, and water permeability, high durability, and high stability are indicated. Accordingly, an economic effect is obtained in which the number of times of repair work is greatly decreased.

Besides, since the road repairing materials of the invention are coupled while a gap is kept, pavement repair with high durability and high stability is enabled in which drainage performance is, excellent, and a phenomenon such peeling does not occur.

Accordingly, the durable years of the pavement can be prolonged, the discharge of pavement waste material is suppressed, reduction of life cycle cost such as time shortening of repair work is obtained, and social cost in works is reduced, and therefore, the economic effect is very high.

What is claimed is:

1. A road repairing material, wherein a road paving member produced by heating and mixing blown asphalt, lubricating oil or lubricating oil waste fluid, semi-blown asphalt, and fine particles of hydrated lime and steel slag, and paving aggregate are heated and mixed to form a coating layer around the paving aggregate, and a covering layer made of a noncohesive material is formed on the coating layer.

2. A road repairing material according to claim 1, wherein the road paving member is mixed with the paving aggregate at a ratio of approximately 5 to 15 wt. %.

3. A road repairing material according to claim 2, wherein the road paving member is obtained by adding the lubricating oil or the lubricating oil waste fluid of 5 to 40 wt. %, the semi-blown asphalt of 5 to 40 wt. %, the hydrated lime of 15 to 35 wt. %, and the steel slag of 5 to 15 wt. % to the blown asphalt, and mixing them for a suitable time while heating.

4. A road repairing material according to claim 1, wherein the road paving member is obtained by adding the lubricating oil or the lubricating oil waste fluid of 5 to 40 wt. %, the semi-blown asphalt of 5 to 40 wt. %, the hydrated lime of 15 to 35 wt. %, and the steel slag of 5 to 15 wt. % to the blown asphalt, and mixing them for a suitable time while heating.

5. A road repairing material according to claim 1, wherein a particle size is 2.5 mm to 20 mm.

6. A road repairing material according to claim 5, wherein the road paving member is obtained by adding the lubricating oil or the lubricating oil waste fluid of 5 to 40 wt. %, the semi-blown asphalt of 5 to 40 wt. %, the hydrated lime of 15 to 35 wt. %, and the steel slag of 5 to 15 wt. % to the blown asphalt, and mixing them for a suitable time while heating.

7. A road repairing material according to claim 1, wherein the road repairing materials are classified into parts of particle sizes of approximately 2.5 mm to 5 mm, approximately 5 mm to 13 mm, and approximately 13 mm to 20 mm, and they are separately managed.

8. A road repairing material, wherein a road paving member produced by heating and mixing blown asphalt or compound asphalt, lubricating oil or lubricating oil waste fluid, hydrated lime and rubber member, and paving aggregate are heated and mixed to form a coating layer around the paving aggregate, and a covering layer made of a noncohesive material is formed on the coating layer.

9. A road repairing material according to claim 8, wherein the road paving member is obtained by adding the lubricating oil or the lubricating oil waste fluid of 5 to 40 wt. %, the rubber member of 1 to 30 wt. %, and the hydrated lime of 5 to 45 wt. % to the blown asphalt or the compound asphalt, and mixing them for a suitable time while heating.

10. A road repairing material according to claim 8, wherein the road paving member is mixed with the paving aggregate at a ratio of approximately 5 to 15 wt. %.

11. A road repairing material according to claim 2, wherein the road paving member is obtained by adding the lubricating oil or the lubricating oil waste fluid of 5 to 40 wt. %, the rubber member of 1 to 30 wt. %, and the hydrated lime of 5 to 45 wt. % to the blown asphalt or the compound asphalt, and mixing them for a suitable time while heating.

12. A road repairing material according to claim 8, wherein a particle size is 2.5 mm to 20 mm.

13. A road repairing material according to claim 8, wherein the road repairing materials are classified into parts of particle sizes of approximately 2.5 mm to 5 mm, approximately 5 mm to 13 mm, and approximately 13 mm to 20 mm, and they are separately managed.

* * * * *